United States Patent
Noh et al.

(10) Patent No.: US 8,455,181 B2
(45) Date of Patent: *Jun. 4, 2013

(54) METHOD FOR MANUFACTURING A PATTERNED RETARDER

(75) Inventors: Hyunjong Noh, Paju-si (KR); Jinho Kim, Paju-si (KR); Youngnam Lim, Seoul (KR); Kyeongjin Kim, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/304,003

(22) Filed: Nov. 23, 2011

(65) Prior Publication Data

US 2012/0129107 A1    May 24, 2012

(30) Foreign Application Priority Data

Nov. 24, 2010 (KR) .................. 10-2010-0117330

(51) Int. Cl.
*G03F 7/20* (2006.01)

(52) U.S. Cl.
USPC .......................................... 430/321

(58) Field of Classification Search
None
See application file for complete search history.

(56) References Cited

U.S. PATENT DOCUMENTS

2004/0263974 A1* 12/2004 McDonough et al. ........ 359/487

FOREIGN PATENT DOCUMENTS

KR         100491752 B1    5/2005

OTHER PUBLICATIONS

Office Action issued in corresponding Korean Patent Application No. 10-2010-0117330, mailed Oct. 8, 2012.

* cited by examiner

*Primary Examiner* — John A. McPherson
(74) *Attorney, Agent, or Firm* — Brinks Hofer Gilson & Lione

(57) ABSTRACT

The present disclosure relates to a method for manufacturing the patterned retarder used in the three-dimensional display device. The present disclosure suggests a method for manufacturing a patterned retarder comprising: defining a first retarder region and a second retarder region in the patterned retarder; forming a first polarization pattern at the first retarder region by a partial exposure process having a first exposure energy; and forming a second polarization pattern at the second retarder region by whole exposure process having a second exposure energy. By manufacturing the patterned retarder with lower exposure energy, it is possible to reduce the whole manufacturing takt time, so that the production yield can be enhanced and the production cost can be reduced.

4 Claims, 5 Drawing Sheets

METHOD FOR MANUFACTURING A PATTERNED RETARDER

This application claims the benefit of Korea Patent Application No. 10-2010-117330 filed on Nov. 24, 2010, the entire contents of which is incorporated herein by reference for all purposes as if fully set forth herein.

BACKGROUND

1. Field of the Invention

The present disclosure relates to a method for manufacturing the patterned retarder used in the three-dimensional display device. Especially, the present disclosure relates to a method for forming two regions having different polarization directions each other on the patterned retarder attached on the surface of the flat panel display device representing 3-D images.

2. Discussion of the Related Art

Recently, thanks to the advancement of the various video contents, display devices, which can selectively reproduce 2D images and 3D images, are being actively developed. For reproducing the 3D images, displays use one of a stereoscopic technique or a autostereoscopic technique.

The stereoscopic technique uses the binocular parallax caused by the human two eyes apart from each other. There are typically two types; one is the glasses type and the other is non-glasses type. For the glasses type, the display device displays the left eye image and the right eye image in different polarization directions or in time division manner. The observer can enjoy the 3D images using the polarization glasses or the liquid crystal shutter glasses. For the non-glasses type, an optical plate such as a parallax barrier for separating an optical axis of the parallel image between the left eye and the right eye is installed in front of or behind of a display screen.

As one example of the glasses type, there is a 3D display device having a patterned retarder on the display panel. This 3D display device represents the 3D images using the polarization characteristics of the patterned retarder and the polarization glasses. Therefore, there is no cross-talk problem between the left eye image and the right eye image, and it ensure brighter luminescent so that the quality of the image is better than other type of 3D display device.

The 3D display device is the device for selectively representing 2D image and 3D image. For the 3D display device having the patterned retarder, there is the patterned retarder on the top surface of the display panel representing the 2D and 3D images selectively. Therefore, by improving the method for manufacturing the patterned retarder, it is required to develop the method for manufacturing the 3D display device having better display quality with low cost.

BRIEF SUMMARY

A method for manufacturing a patterned retarder comprises: defining a first retarder region and a second retarder region in the patterned retarder; forming a first polarization pattern at the first retarder region by a partial exposure process having a first exposure energy; and forming a second polarization pattern at the second retarder region by whole exposure process having a second exposure energy.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE DRAWINGS AND THE PRESENTLY PREFERRED EMBODIMENTS

Figure 1:
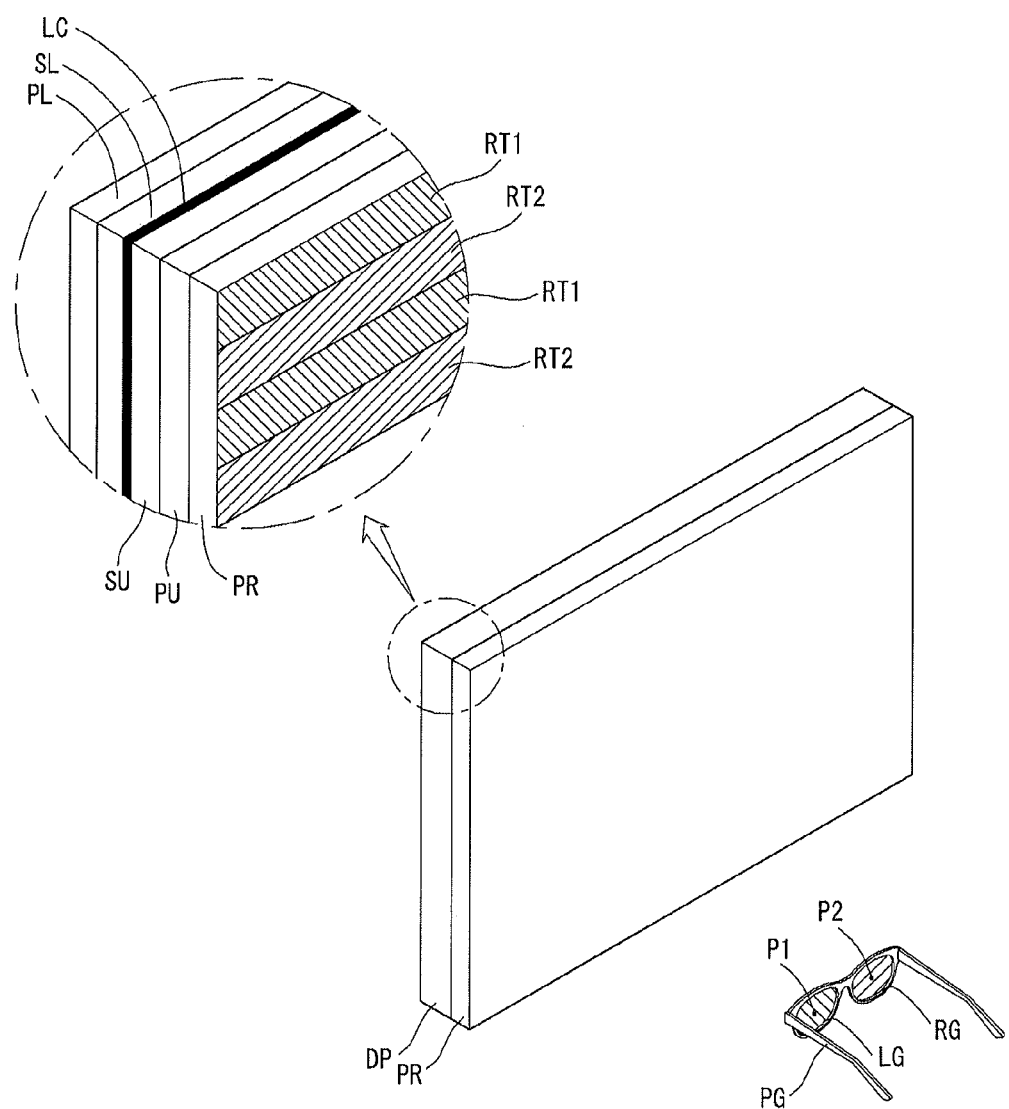
FIG. 1 is the perspective view illustrating the structure of a display device having a patterned retarder according to an embodiment of the present disclosure.

Hereinafter, referring to attached figures, we will explain preferred embodiments of the present disclosure. FIG. 1 is the perspective view illustrating the structure of a display device having a patterned retarder according to the present disclosure. Referring to FIG. 1, the display device according to the present disclosure includes a display panel DP representing 2D image or 3D image, a patterned retarder PR attached on the front surface of the display panel DP, and polarization glasses PG.

The display panel DP can include any one of the liquid crystal display device (or LCD), the field emission display (or ED), the plasma display panel (or PDP), and the electroluminescence device (or EL) including the inorganic light emitting diode and the organic emitting diode (or OLED). Hereinafter, we will explain the embodiments of the present disclosure focused on the case in which the display panel DP is the liquid crystal display panel. The patterned retarder PR and the polarization glasses PG are other components for the 3D display system used for representing the binocular parallax by separating the left eye image and the right eye image.

The display panel DP comprises two glass substrates and a liquid crystal layer LC inserted therebetween. The display panel DP includes liquid crystal cells disposed in matrix manner defined by the crossing structure of the data line and the gate line. The lower glass substrate SL of the display panel DP comprises the pixel arrays including the data lines, the gate lines, the thin film transistors, the pixel electrodes, and the storage capacitors. The upper glass substrate SU of the display panel DP comprises the black matrix, the color filter, and the common electrode. Each liquid crystal cell is driven by the electric field formed between the pixel electrode connected to the thin film transistor and the common electrode. Each inside surface of the upper glass substrate SU and the lower glass substrate SL has an alignment layer, respectively for setting up the pre tilt angle of the liquid crystal. Each outside surface of the upper glass substrate SU and the lower glass substrate SL has the upper polarization film PU and the lower polarization film PL, respectively. The common electrode may be formed on the upper glass substrate SU for the vertical electric field type LCD such as the TN (Twisted Nematic) mode and the VA (Vertical Alignment) mode. In other hands, the common electrode may be formed on the lower glass substrate SL with the pixel electrode for the horizontal electric field type LCD such as IPS (In Plane Switching) mode and the FFS (Fringe Field Switching) mode.

Between the lower and the upper glass substrates, a column space may be formed to maintain the cell gaps of the liquid crystal cell evenly.

The display panel DP can be any type of LCD panel including the TN mode LCD, VA mode LCD, IPS mode LCD, and FFS mode LCD. Furthermore, the display panel DP according to this disclosure can be any kind of display device including the transmissive display device, the reflective display device, and the transmissive-reflective display device. For the transmissive and the transmissive-reflective display devices, a back light unit is required. The back light unit can be any one of the direct type and the edge type.

The patterned retarder PR is attached on the outside surface of the upper polarization film PU of the display panel DP. The patterned retarder PR has a unit retarder corresponding to each line of pixel arrayed in the horizontal direction of the display panel DP. For example, one unit retarder can be defined as corresponding to the area of the pixels commonly connected to one gate line. Especially, the first retarder RT1 is formed as to be corresponding to the odd numbered lines of the patterned retarder PR, and the second retarder RT2 is formed as to be corresponding to the even numbered lines of the patterned retarder PR. The light absorbing axis of the first retarder RT1 and the light absorbing axis of the second retarder RT2 are perpendicular each other. The first retarder RT1 can transmit the first polarized light (circular polarized light or linear polarized light), wherein the light is incident from the pixel array. The second retarder RT2 can transmit the second polarized light (circular polarized light or linear polarized light), wherein the light is incident from the pixel array. For example, the first retarder RT1 of the patterned retarder PR can be the polarizing filter transmitting the left circular polarized light, and the second retarder RT2 of the patterned retarder PR can be the polarizing filter transmitting the right circular polarized light.

The polarization glasses PG comprises a left glass window LG having the first polarizing filter P1 and a right glass window RG having the second polarizing filter P2. The first polarizing filter P1 has the same light transmitting axis with that of the first retarder RT1 of the patterned retarder PR. At the same time, the second polarizing filter P2 has the same light transmitting axis with that of the second retarder RT2 of the patterned retarder PR. For example, the first polarizing filter P1 of the polarization glasses PG can be the left circular polarizing filter, and the second polarizing filter P2 of the polarization glasses PG can be the right circular polarizing filter.

With this structure, by representing the left images on the pixels relating to the first retarder RT1, and representing the right images on the pixels relating to the second retarder RT2, the 3D images can be implemented. For example, when the first retarder RT1 has the same polarization pattern with the left circular polarizing filter, the left eye images are radiated as the left circular polarized light so that the left eye images can be recognized only by the left eye of the observer through the first polarizing filter P1 of the polarization glasses PG. At the same time, when the second retarder RT2 has the same polarization pattern with the right circular polarizing filter, the right eye images are radiated as the right circular polarized light so that the right eye images can be recognized only by the right eye of the observer through the second polarizing filter P2 of the polarization glasses PG.

Figure 2:
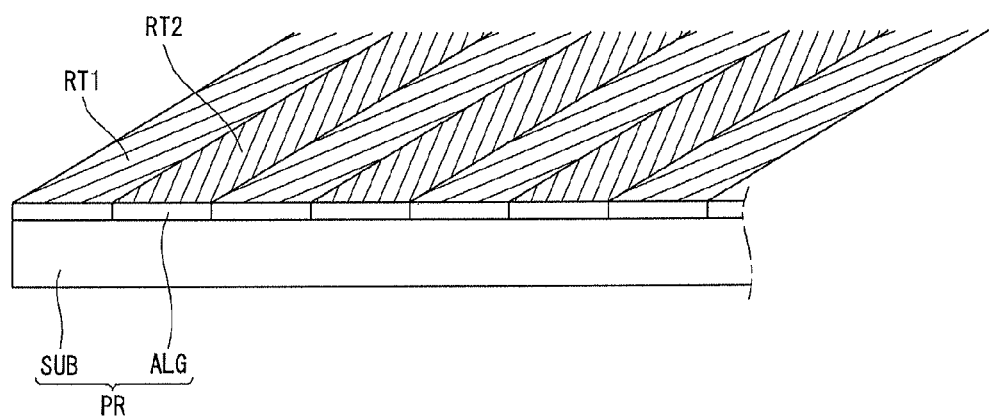
FIG. 2 is the cross-sectional view illustrating the structure of a patterned retarder according to an embodiment of the present disclosure.
Figure 3A:
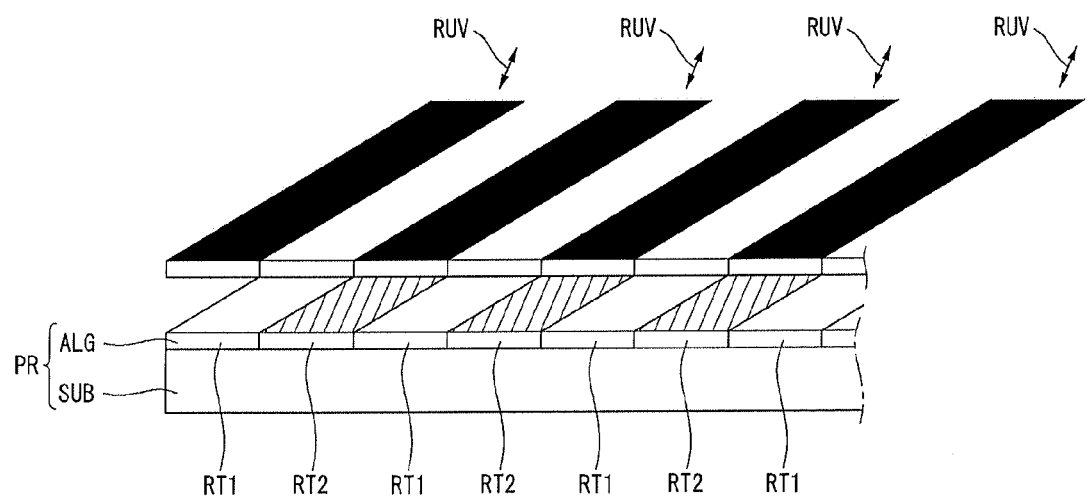
FIGS. 3A to 3C show the steps for manufacturing a patterned retarder according to the first embodiment of the present disclosure.
Figure 3B:
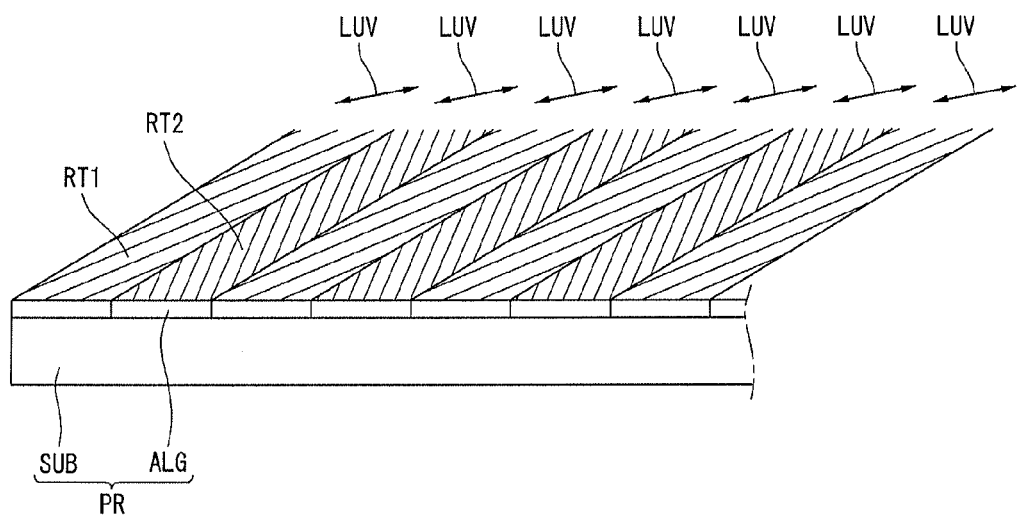
Figure 3C:
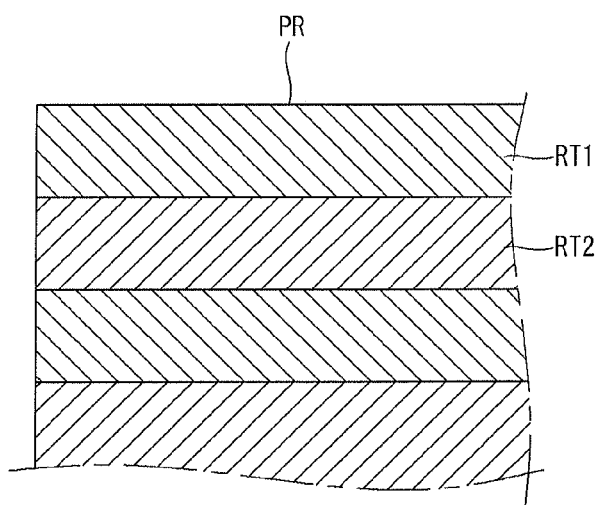
Figure 4A:
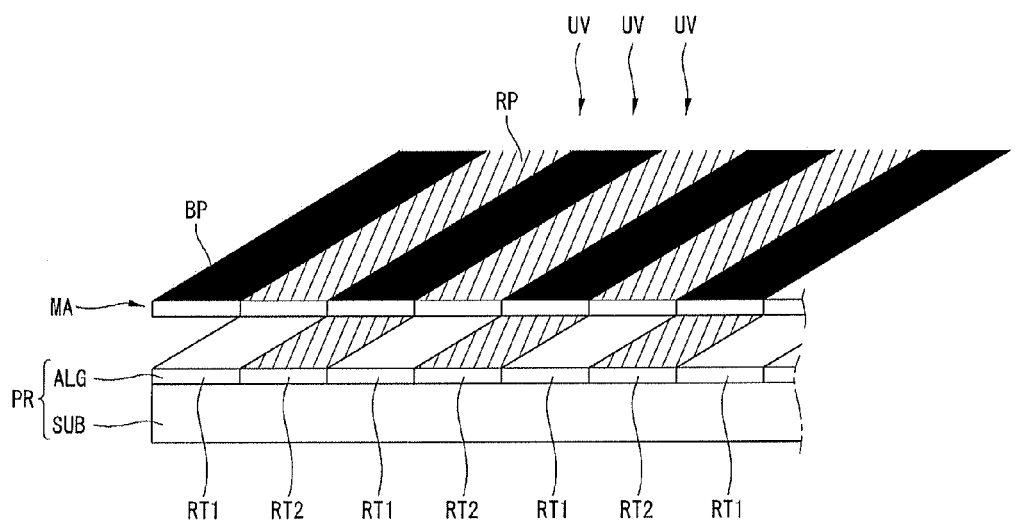
FIGS. 4A to 4C show the steps for manufacturing a patterned retarder according to the second embodiment of the present disclosure.
Figure 4B:
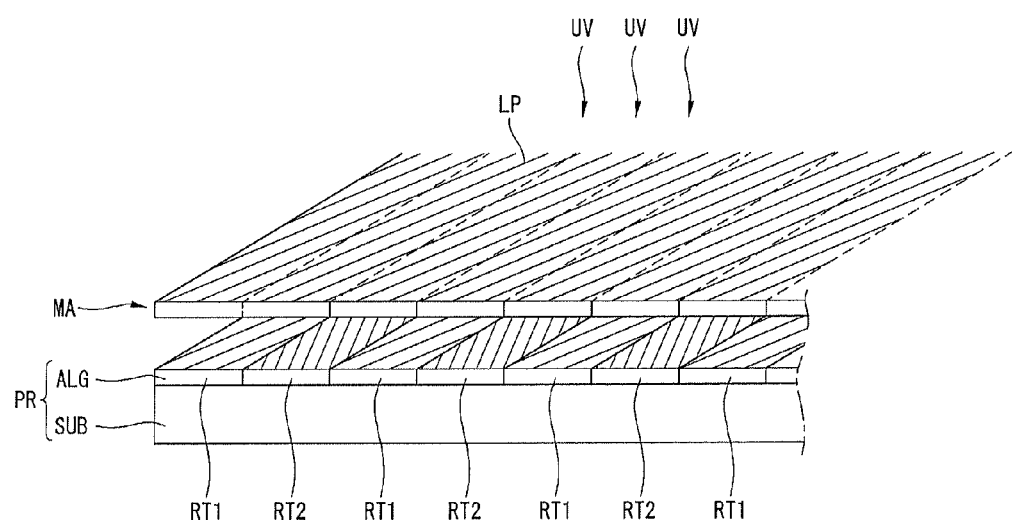
Figure 4C:
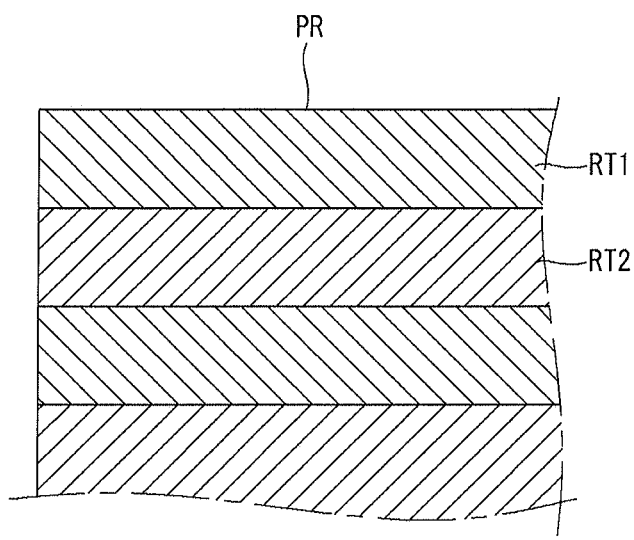

Hereinafter, referring to FIGS. 2 to 4C, we will explain about the method for manufacturing the patterned retarder according to the present disclosure, in detail. FIG. 2 is the cross-sectional view illustrating the structure of a patterned retarder according to the present disclosure. FIGS. 3A to 3C show the steps for manufacturing a patterned retarder according to the first embodiment of the present disclosure. FIGS. 4A to 4C show the steps for manufacturing a patterned retarder according to the second embodiment of the present disclosure.

At first referring to FIG. 2, we will explain about the structure of the patterned retarder according to the present disclosure briefly. The patterned retarder PR comprises a base substrate SUB such as PET or glass, and a photo sensitive alignment layer ALG disposed on the base substrate SUB. The photo sensitive alignment layer ALG has the characteristics in which it is hardened by the ultra violet light. Especially, when the UV light with a mask having a pattern, the photo sensitive alignment layer ALG may have the pattern. For example, when the photo sensitive alignment layer ALG deposited on the patterned retarder PR is patterned to have the left circular polarizing pattern, the light transmitting the patterned retarder PR is polarized to the left circular polarization.

The patterned retarder PR according to the present disclosure has the first retarder RT1 and the second retarder RT2 running to the horizontal direction are alternatively arrayed along the vertical direction. The first retarder RT1 has the left circular polarization pattern, and the second retarder RT2 has the right circular polarization pattern. The first retarder RT1 is located by aligning with the pixel area representing the left eye images, and the second retarder RT2 is located by aligning with the pixel area representing the right eye images. Then, the left eye images are radiated as the left circular polarized light, and the right eye images are radiated as the right circular polarized light.

Hereinafter, referring to FIGS. 3A to 3C, we will explain about the method for manufacturing a patterned retarder according to the first embodiment of the present disclosure.

A mask MA blocking the UV light is disposed over the area where the first retarder RT1 is defined in the photo sensitive alignment layer ALG of the patterned retarder. After that, a right circularly polarized UV light is radiated over the patterned retarder PR. Especially, the exposure energy would be set less than 50 mJ/cm2. Then, the second retarder RT2 of the photo sensitive alignment layer ALG not blocked by the mask MA has an aligned pattern along with the right circular polarization pattern, as shown in FIG. 3A.

As shown in FIG. 3B, the mask MA is removed, and then a left circular patterned UV light is radiated on the overall surface of the patterned retarder PR. Then, the first retarder RT1 of the photo sensitive alignment layer ALG has an aligned pattern along with the left circular polarization pattern. At this time, the second retarder RT2 of the photo sensitive alignment layer ALG having the right circular polarization pattern may have not been changed, or it can be changed to have the left circular polarization pattern. In the present disclosure, the second patterned retarder RT2 of the photo sensitive alignment layer ALG having the right circular polarization pattern already should not be changed to maintain the right circular polarization pattern. To do so, it is important to set the exposure energy of the left circular polarized UV light should be less energy than that of the right circular polarized UV light used in the former process. For example, the exposure energy for the left circular polarized UV light would be preferably have the energy of 60% or less than that for the right circular polarized UV light. If the exposure energy for the left circular polarized UV light is set to have 50 mJ/cm2, then the exposure energy for the right circular polarized UV light would preferably be set to have 30 mJ/cm2 or less.

As a result, the patterned retarder PR is completed in which the first retarder RT1 has the left circular polarization pattern, and the second retarder RT2 has the right circular polarization pattern, as shown in FIG. 3C.

Hereinafter, referring to FIGS. 4A to 4C, we will explain about the method for manufacturing a patterned retarder according to the second embodiment of the present disclosure.

A black pattern BP blocking the UV light is located over the first patterned retarder RT1 of the photo sensitive alignment layer ALG in the patterned retarder PR, and a mask MA having the right circular polarization pattern RP is located over the second retarder RT2. After that, an UV light is radiated over the patterned retarder PR. Especially, the exposure energy would be set to 50 mJ/cm2 or less. As a result, the second retarder RT2 of the photo sensitive alignment layer ALG covered by the light circular polarization pattern RP is aligned to have the right circular polarization pattern, as shown in FIG. 4A.

Next, as shown in FIG. 4B, a mask MA having the left circular polarization pattern LP is located over all surfaces of the photo sensitive alignment layer ALG. Then, an UV is radiated over all surface of the patterned retarder PR. As a result, the first retarder RT1 of the photo sensitive alignment layer ALG is aligned to have the left circular polarization pattern. At this time, in order not to change the second retarder RT2 of the photo sensitive alignment layer ALG, the exposure energy of the UV light would preferably be set to 60% or less than that of the UV light used in FIG. 4A. If the exposure energy of the UV light used for forming the left circular polarization pattern is set to 50 mJ/cm2, then the exposure energy of the UV light used for forming the right circular polarization pattern would preferably be set to 30 mJ/cm2.

As a result, the patterned retarder PR is completed in which the first retarder RT1 has the left circular polarization pattern, and the second retarder RT2 has the right circular polarization pattern, as shown in FIG. 4C.

As explained in the first and second embodiments of the present disclosure, the partial (or local) UV exposure process is conducted at first, and then the whole UV exposure process is conducted, so that it is possible to use lower exposure energy at the later exposure process than the former exposure process. By comparing with the method in which higher exposure energy is required at the later exposure process than at the former exposure process, it has high efficiency for the exposure energy. Furthermore, it is possible to complete the patterned retarder with lower exposure energy. Therefore, the manufacturing process time would be reduced and the cost can be saved.

While the embodiment of the present invention has been described in detail with reference to the drawings, it will be understood by those skilled in the art that the invention can be implemented in other specific forms without changing the technical spirit or essential features of the invention. Therefore, it should be noted that the forgoing embodiments are merely illustrative in all aspects and are not to be construed as limiting the invention. The scope of the invention is defined by the appended claims rather than the detailed description of the invention. All changes or modifications or their equivalents made within the meanings and scope of the claims should be construed as falling within the scope of the invention.

The invention claimed is:

1. A method for manufacturing a patterned retarder comprising:
    defining a first retarder region and a second retarder region in the patterned retarder;
    forming a first polarization pattern at the first retarder region by a partial exposure process having a first exposure energy; and
    forming a second polarization pattern at the second retarder region by whole exposure process having a second exposure energy,
    wherein the second exposure energy is about 60% or less than the first exposure energy.

2. The method according to the claim 1, wherein the partial exposure process is conducted by exposing the first retarder region with a first polarized light having the first exposure energy using a mask exposing the first retarder region and blocking the second retarder region; and
    wherein the whole exposure process is conducted by exposing the first and the second retarder regions with a second polarized light having the second exposure energy.

3. The method according to the claim 1, wherein the partial exposure process is conducted by exposing with a ultra violet light having the first exposure energy using a first mask having a first polarization pattern at the first retarder region and a black pattern at the second retarder region; and
    wherein the whole exposure process is conducted by exposing with a ultra violet light having a second exposure energy using a second mask having a second polarization pattern at the first and the second retarder regions.

4. The method according to the claim 1, wherein the first exposure energy is in the range of about 1~50 mJ/cm$^2$, and
    wherein the second exposure energy is in the range of about 1~30 mJ/cm$^2$, and less than the first exposure energy.

* * * * *